(12) United States Patent
Theiss et al.

(10) Patent No.: US 7,425,695 B2
(45) Date of Patent: Sep. 16, 2008

(54) LIGHT TESTER FOR VEHICLES, PREFERABLY FOR MOTOR VEHICLES, WITH RAY SELECTION UNIT CONSISTING OF PERFORATED PLATES SPACED AT DIFFERENT SPACINGS FROM ONE ANOTHER

(75) Inventors: Peter Theiss, Stuttgart (DE); Herbert Wehlan, Leonberg (DE)

(73) Assignee: Scala Design GmbH, Böblingen (DE)

( * ) Notice: Subject to any disclaimer, the term of this patent is extended or adjusted under 35 U.S.C. 154(b) by 0 days.

(21) Appl. No.: 11/208,311

(22) Filed: Aug. 19, 2005

(65) Prior Publication Data
US 2007/0080289 A1  Apr. 12, 2007

(51) Int. Cl.
H01L 31/00 (2006.01)

(52) U.S. Cl. .......... 250/214.1; 250/239; 356/141.1; 356/141.2; 356/221

(58) Field of Classification Search .......... 250/239, 250/214.1; 362/456; 356/121, 122, 123, 356/138, 141, 147, 150–154, 213, 218, 221, 356/141.1, 141.2; 372/43, 102, 103
See application file for complete search history.

(56) References Cited

U.S. PATENT DOCUMENTS

| 4,498,767 | A | * | 2/1985 | McGovern et al. .......... 356/121 |
| 4,877,308 | A | * | 10/1989 | Okuno et al. .......... 359/601 |
| 5,392,111 | A | | 2/1995 | Murata et al. |
| 6,566,723 | B1 | * | 5/2003 | Vook et al. .......... 257/440 |

FOREIGN PATENT DOCUMENTS

SU  996 897 A  2/1983

* cited by examiner

Primary Examiner—Georgia Y. Epps
Assistant Examiner—Francis M Legasse, Jr.
(74) Attorney, Agent, or Firm—Gudrun E. Huckett

(57) ABSTRACT

The measurement head is equipped with the ray selection unit, which is entered by the rays emitted by the light unit under test. These rays enter the passages and are detected by the ray detection unit when they exit the ray selection unit. Said ray detection unit provides signals corresponding to the detected image, which are sent on for further processing. A precise measurement of the light unit is possible using the inventive light tester.

14 Claims, 5 Drawing Sheets

LIGHT TESTER FOR VEHICLES, PREFERABLY FOR MOTOR VEHICLES, WITH RAY SELECTION UNIT CONSISTING OF PERFORATED PLATES SPACED AT DIFFERENT SPACINGS FROM ONE ANOTHER

TECHNICAL FIELD

The invention concerns a light tester for vehicles, preferably for motor vehicles.

BACKGROUND OF THE INVENTION

Light testers are known with which the light radiated from a taillight is detected and tested with respect to its luminous intensity. Such light testers have a measurement head with a converging lens and a photocell. The measurement head thus works essentially like a light meter which detects the rays emitted by the light unit under test. With the measurement head, it is possible to determine whether the luminous intensity of the light unit under test meets legal requirements. Taillights can be roughly measured with this light tester. A problematic factor is the influence of ambient light, which can impede the measurement process.

The object of the invention is to design a light tester such that the measurement process can be performed precisely and reliably using a simple design.

This object is attained in accordance with the invention in the light tester.

SUMMARY OF THE INVENTION

The spatial distribution of the brightness of the light unit in a certain direction, such as the HO-VO direction, can be detected reliably. Precise positioning of the light tester in the vertical, horizontal, and/or longitudinal direction with respect to the light unit during the measurement process is not necessary. For these directions, relatively rough positioning is sufficient for reliable measurement. The light tester can also be used to measure dynamic light units, to measure rear reflectors, and even to measure headlights. The ray selection unit ensures that only the light emitted by the light unit under test exits the ray selection unit and is detected by the ray detection unit. Luminous intensities in specific directions can be measured with the ray selection unit. In order to at least largely exclude the ambient light fraction, e.g. from reflections off the surface of the light unit in the measured direction, this fraction is advantageously eliminated by software. Thus the computational integration of the image brightness can be restricted to the image section belonging to the measured light unit. Another possibility is to record an image with the light unit switched off (dark measurement) and subtract it from the measurement image.

Additional features of the invention are apparent from the other claims, the description, and the drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention is explained in detail below on the basis of some example embodiments shown in the drawings. The drawings show.

DETAILED DESCRIPTION OF THE PREFERRED EMBODIMENTS

Figure 1:
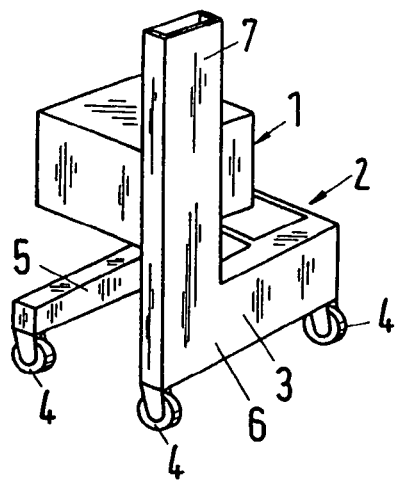
FIG. 1, a perspective and simplified view of a first embodiment of an inventive light tester, FIG. 2 through FIG. 4, in representations as in FIG. 1, additional embodiments of inventive light testers, FIG. 5, a schematic representation of the measurement principle using the inventive light tester, FIG. 6 and FIG. 7, enlarged views of sections of the ray selection unit of the inventive light tester in a tubular design, FIG. 8, a schematic representation of the ray path within the ray selection unit in a perforated plate design, FIG. 9, a schematic representation of a section through the ray selection unit in a perforated plate design, FIG. 10, a schematic representation of the inventive light tester during the measurement process, FIG. 11, another measurement process in a representation corresponding to FIG. 10.

Using the light tester, taillights of vehicles can be tested with respect to their functionality. Using the light tester, the luminous intensities of taillights, brake lights, turn signals, rear fog lights, and back-up lights can be measured.

The tester has a measurement head 1, which is arranged on a movable frame 2. The frame 2 has a U-shaped frame section 3 on whose underside are supported wheels or rollers 4. The frame 2 is advantageously supported on four wheels 4 located at both ends of the parallel arms 5 and 6 of the frame section 3. The wheels 4 are advantageously supported on the frame section arms 5, 6 so as to be rotatable about vertical axes.

A column 7 on which the measurement head 1 is supported extends vertically from the free end of the frame section arm 6. The measurement head 1 is located in the region above the frame section arms 5, 6 so that no danger of tipping exists when the frame 2 is moved with the measurement head 1. In a simple embodiment, the measurement head 1 is rigidly attached to the column 7. In this case, the height of the measurement head 1 above the floor corresponds to the customary height above the floor of the taillights to be measured.

It is of course possible to arrange the measurement head 1 to be movable in the longitudinal direction of the column 7. In such a case, it is advantageous for the measurement head 1 to be continuously movable so that it can be adjusted to any required position for measuring the vehicle taillights. The possibility also exists of providing detent positions on the column 7 for the measurement head 1. For example, the location of the detent positions corresponds to the heights above the floor of taillights to be measured in accordance with the most important standards in Europe, the USA or Japan, for example.

Figure 2:
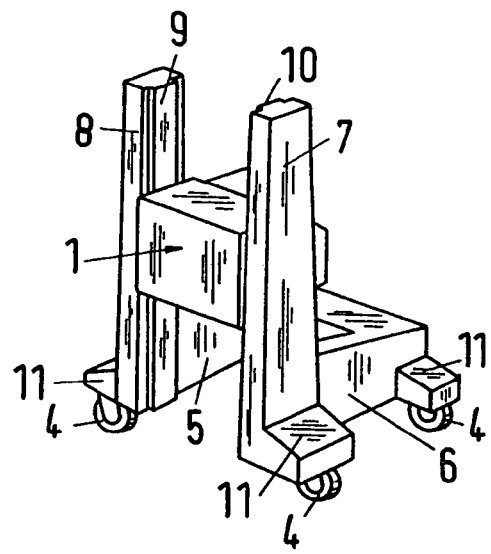

In the embodiment in FIG. 2, the measurement head 1 is supported by two columns 7, 8, which project vertically upward from the free ends of the frame section arms 5, 6. As in the previous example embodiment, the measurement head 1 can be mounted rigidly between the columns 7, 8. However, it is advantageous for the measurement head 1 to be adjustable in height between the columns 7, 8, preferably continuously adjustable. For this purpose, the columns 7, 8 are provided on their sides facing each other with guides 9, 10 along which the measurement head 1 can slide. For adjustment of the measurement head 1 along the guides 9, 10, it is advantageous for a drive (not shown) to be used with which the measurement head 1 can be adjusted to the desired height.

To achieve high stability of the light tester, the wheels or rollers 4 are placed on lateral outriggers 11 located on the two ends of the frame section arms 5, 6.

Figure 3:
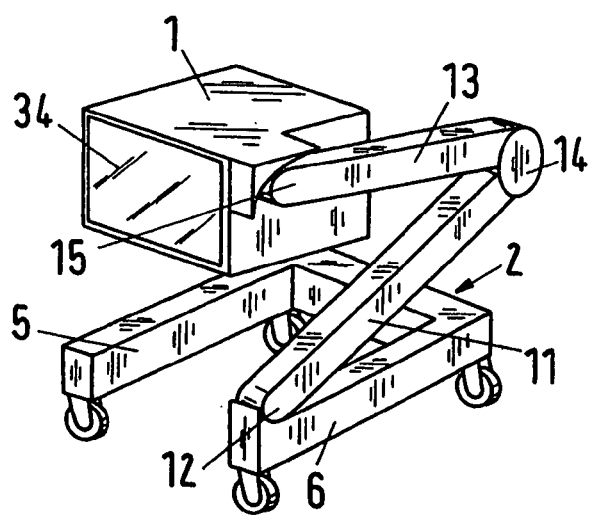

FIG. 3 shows an embodiment in which one end of an arm 11 is mounted on the free end of the arm 6 of the U-shaped frame 2 so as to pivot about a horizontal axis 12. Hinged to the other end of the arm 11 is another arm 13, which carries the measurement head 1 at its free end. The two arms 11, 13 can be pivoted with respect to one another about their common axis 14, which is parallel to the pivot axis 12. The measurement head 1 is connected to the arm 13 such that it can pivot about a horizontal axis 15. The two arms 11, 13 can be pivoted relative to one another by a motor drive so that the measurement head 1 can be adjusted to any desired height. The actuating drive for such adjusting devices 11, 13 designed after the manner of a lifting platform is known, and thus is not described in detail.

The two arms 11, 13 lie above one another in a vertical plane, and can be pivoted relative to one another such that they rest one upon the other. The measurement head 1 is located in the region between the two frame section arms 5, 6, which are spaced apart from one another such that the measurement head 1 can come between the two arms 5, 6 in its lowest position. In this position, the light tester has only a very short overall height.

The free end of the arm 11 of the adjusting device can also be hinged to the frame 2 about two axes. In addition to the horizontal pivot axis 12, a vertical pivot axis can also be provided. As a result, the adjusting device 11, 13 can also be pivoted about this vertical axis relative to the frame 2. As a result, the measurement head 1 can be adjusted in a variety of ways.

Figure 4:
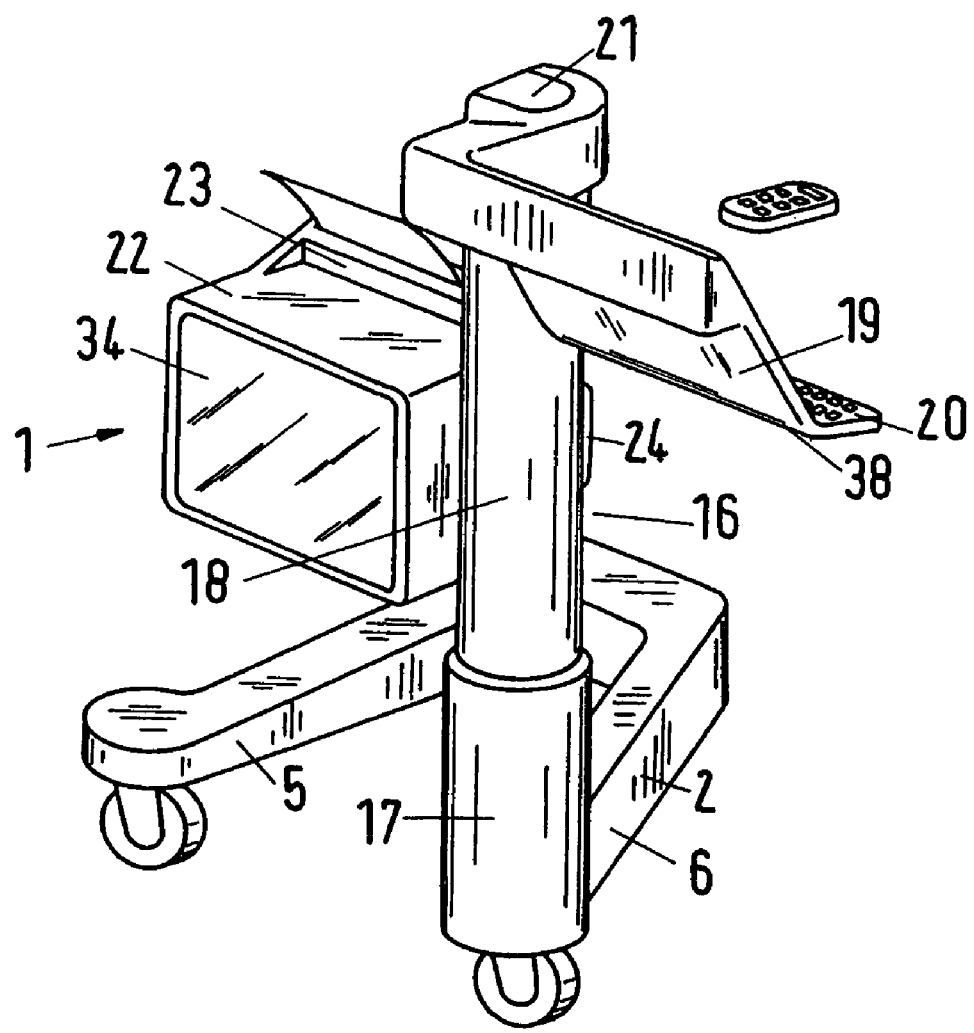

The light tester from FIG. 4 has an essentially U-shaped frame 2, but in contrast to the preceding example embodiments its two arms 5, 6 are not parallel to one another, but instead converge toward their free ends. Located at the free end of the frame section arm 6 is an adjustable-height telescoping column 16, by which means the measurement head 1 can be continuously adjusted in height. The telescoping column 16 has, rigidly attached to the free end of the frame section arm 6, a column part 17 which accommodates the adjustable-height column part 18. Mounted at the top end of the column part 18 are a monitor 19 and a keyboard 20. The two parts 19, 20 advantageously rest on a support unit 38, which can pivot about the vertical axis 21 of the column part 18. The keyboard 20 can be used to enter, in a manner to be described later, inputs during the measurement process that are processed by a computer (not shown). In the example embodiment, the computer is accommodated in a housing 22 of the measurement head 1. In advantageous fashion a printer 23, which can be used for making log printouts and the like, is also located in this housing 22. Of course, it is also possible to provide the computer and/or the printer centrally and to transmit the data over the network or wirelessly from the keyboard 20.

The column part 18 can be motor driven in the vertical direction. However, it is also possible to design the adjusting device 16 such that the column part 18 can be pushed upwards by hand and automatically locked in any desired adjustment position. In order to facilitate this manual adjustment, a handle 24 for easy height adjustment can be provided on the column part 18 and/or on the housing 22 of the measurement head 1.

The light tester is used to test the functionality of type tested and approved taillights of motor vehicles. This testing includes all important active components of a vehicle taillight. The test determines whether the taillight satisfies legal requirements with regard to the luminous intensity of its components in certain directions, e.g. in the HO-VO direction. The luminous intensity of the components of the taillights is tested with the light tester.

Figure 5:
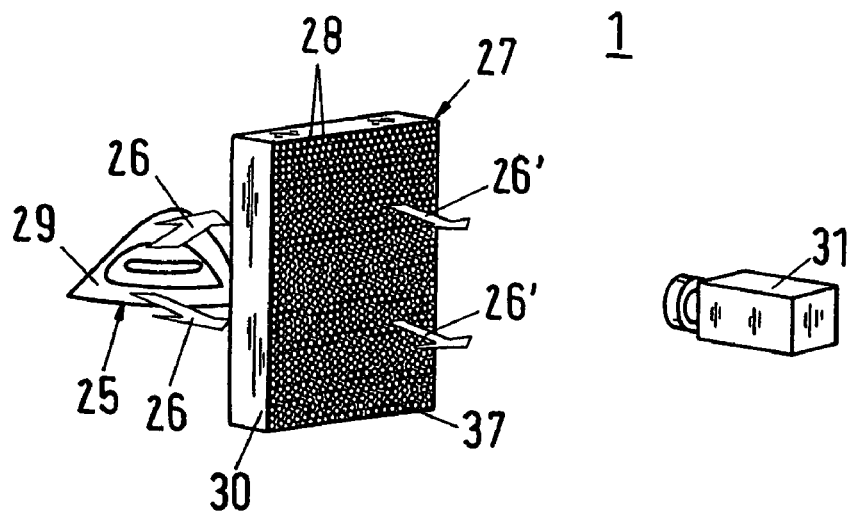

FIG. 5 shows the basic measurement setup. The taillight under test is designated 25. The rays 26 it emits, shown as arrows, strike the measurement head 1, which in the example embodiment has a plate stack 27 of multiple perforated plates. The plate stack 27 constitutes a matte black ray selection unit. The openings 28 in the perforated plates of the plate stack 27 allow the rays 26 emitted by the taillight 25 to pass. As FIG. 5 shows, the rays 26 exit the optical window 29 of the taillight 25 in different directions. In the plate stack 27, the rays 26 are selected (in a manner to be described later) such that they emerge aimed toward the exit side 30 of the plate stack 27. In the example embodiment shown, the rays 26' exit in the horizontal direction. The exit side 30 of the plate stack 27 is recorded by a camera 31 through a ground-glass screen 34. The camera is advantageously a digital camera which is connected to the computer. The rays 26' emerging from the exit side 30 form an image of the local distribution of the brightness of the functional parts under test of the taillight 25 in the measured direction. This image is recorded by the camera 31 and can be further processed by the connected computer. By means of the camera 31, the local distribution of the brightness in the measured direction can be determined precisely, with a relatively rough positioning of the light tester being sufficient for the measurement. After processing of the data in the computer, a measurement log can be printed out by means of the printer 23. Depending on the software used, the measurement results can be printed out in the form of diagrams and the like, so that the measurement results can be prepared optimally for the relevant application. In addition to or in place of a printout, the measurement results can also be displayed on the monitor 19, which can be a flat screen display, for example. The measurement results produced by the camera 31 can be compared with measured data stored in a data storage device, for example. Thus, deviations between the measured data prescribed by the applicable standard and the measured actual data can easily be recognized and displayed, for example on the flat-screen display or on the measurement log to be printed.

Figure 6:
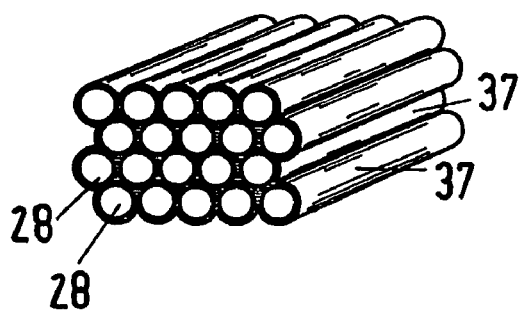
Figure 7:
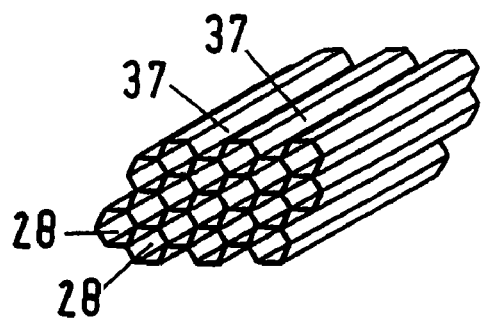

Schematically shown in FIGS. 6 and 7 are possible cross-sectional shapes of the openings 28 of the matte black ray selection unit in a tubular design 37. In the embodiment from FIG. 6, the tubes 37 have a circular cross-section 28, while the tubes 37 in the example embodiment from FIG. 7 have a hexagonal cross-section 28. The length of the tubes 37 is meant to indicate the thickness of the ray selection unit.

Figure 9:
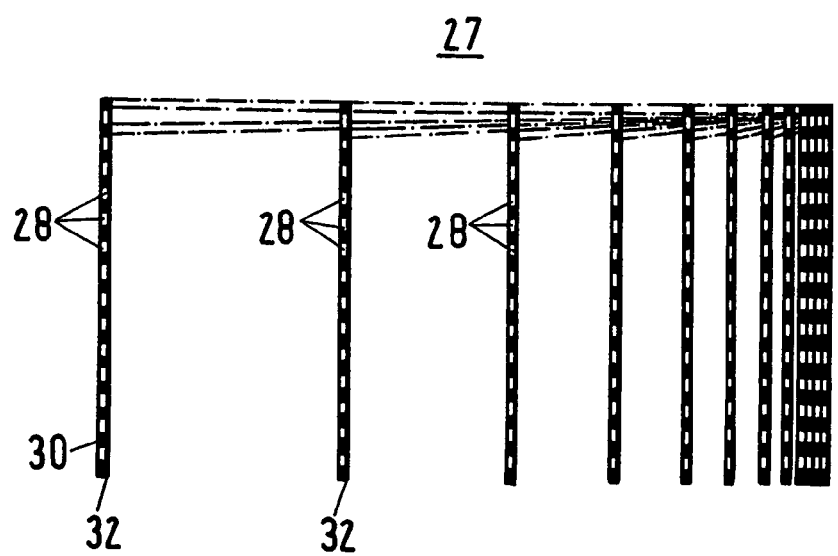

The structure of the plate stack 27 is described in detail using FIG. 9. It consists of individual plates 32 placed parallel to one another, each of which is designed as a perforated plate. The plates 32 are of identical design but are arranged at different spacings from one another. The spacings between the plates 32 are chosen such that light can only pass through openings 28 of the plates 32 located directly in front of one another. This prevents, for example, a ray 26 falling at an angle on the plate stack 27 from reaching the exit side 30 unhindered.

Figure 8:
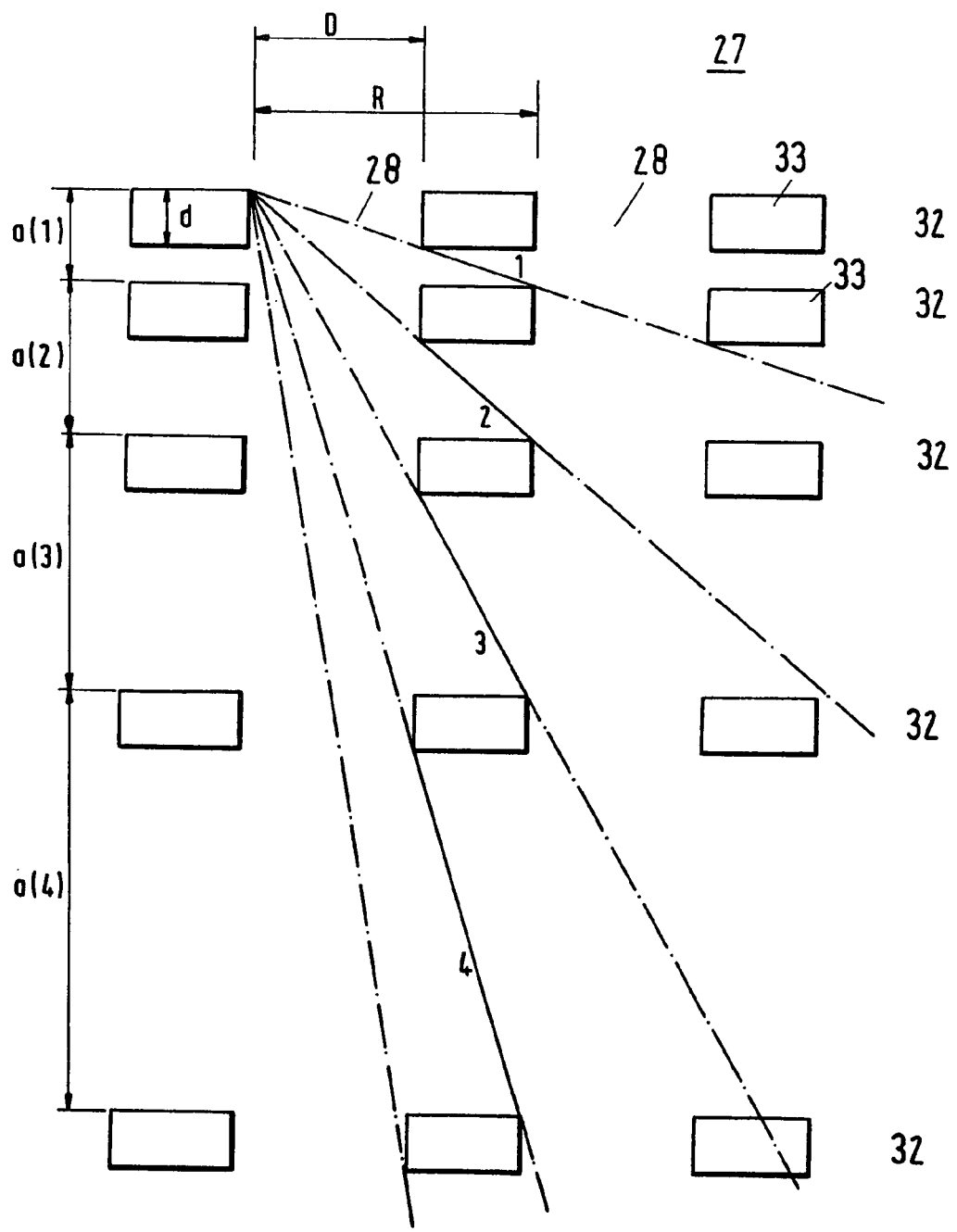

FIG. 8 schematically shows the principle of operation of the plate stack 27. The plates 32 have a thickness d and the circular holes 28, whose diameter is labeled D. The center-to-center spacing of the openings 28 in each plate 32 is given by R. The plates 32 have different spacings $a(1)$, $a(2)$, $a(3)$, $a(4)$ . . . from one another. The spacing of the plates 32 from one another increases from the light entry side toward the exit side 30. The spacings of the plates 32 from one another are thus a(i), where i=1, 2, .... The maximum spacing between the plates 32 is thus determined by the formula $$a(i+1)=a(i) \times R/D.$$

Here, a(0)=d, and:
 d represents sheet thickness
 R represents center-to-center hole spacing, grid spacing
 D represents hole diameter The formula applies for circular openings and for a hexagonal (honeycomb-like) hole arrangement. For other arrangements of openings, the minimum center-to-center hole spacing should be used instead of the center-to-center hole spacing R.

Using the above formula, a minimum number of plates 32 can very easily be achieved with a maximum spacing of the plates 32. In this way, the minimum number of plates can be determined for a given thickness of the plate stack 27 and a given number of plates 32.

Shown by way of example in FIG. 8 are four rays 1 through 4, which pass through the plate stack 27. It can be seen that rays entering the openings 28 at an angle do not pass unhindered to the exit side 30, but are instead captured by the webs 33 located between the openings 28.

Provided behind the plate stack 27 on the exit side 30 is a ground-glass screen 34 (FIGS. 3 and 4), which images the luminous area of the taillight. The camera 31 records this image on the ground-glass screen 34. The plate stack 27 is accommodated in a protected manner in the housing 22. A light-permeable window, which does not change the direction of the rays passing through it, may be provided on the light entry side of the housing 22.

In one example embodiment, the opening diameter D is 3 mm, the center-to-center hole spacing R is 5 mm, and the thickness d of the plate 32 is 1 mm. The plates 32 can have a size of 320 by 420 mm, for example, with the measurement area being, for example, 300 by 400 mm. These numbers merely represent examples, and do not limit the design of the measurement head 1 to such dimensions. In principle, the plates 32 can have any suitable size, independent of the desired recording area and the size of the measurement head 1.

The cross-sectional area of the plates 32 is advantageously large enough that all of the light emitted by the light unit 25 under test is detected. If relatively large light units are to be measured, it can be advantageous to measure the emitting areas of the taillight 25 one after another with the measurement head 1 instead of increasing the cross-sectional area of the plate stack 27. In terms of computation, with appropriate software it is easily possible to process the various measurement areas such that a combined measurement area is displayed as the measurement result.

Figure 10:
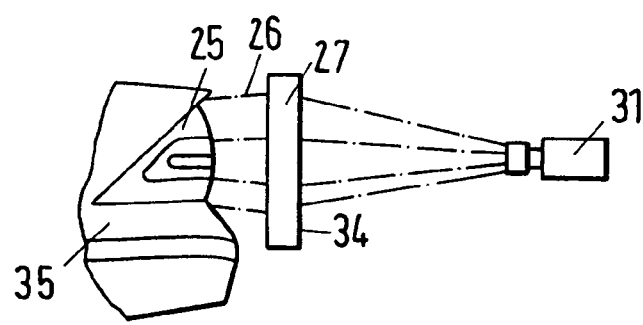

FIG. 10 shows a measurement arrangement when measuring the taillight 25 of a motor vehicle 35. The rays 26 emerging rearward from the taillight 25 enter the plate stack 27 of the measurement head 1. Here, the rays 26 pass through the openings 28 of the plates 32 in the manner described, and reach the exit-side ground-glass screen 34. The luminous area of the taillight 25 under test is imaged on said screen. This image is recorded by the camera 31, which is oriented perpendicular to the ground-glass screen 34.

Figure 11:
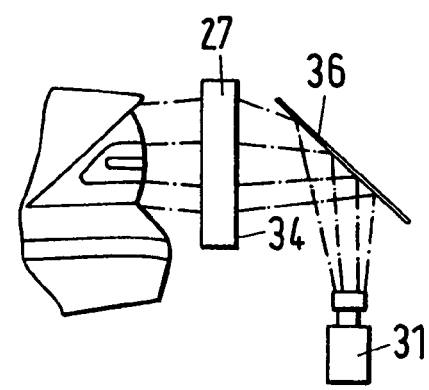

It is also possible to arrange the camera 31 such that its field of view does not lie parallel to the ground-glass screen 34 of the plate stack 27 (FIG. 11). In order nevertheless to record the image on the ground-glass screen 34, a reflex mirror 36 is provided, at which the camera 31 is directed. The reflex mirror 36 is accommodated in the housing 22 of the measurement head 1. It is also possible to articulate the reflex mirror 36 to the outside of the measurement head housing 22 so that it can be pivoted away when necessary, and the camera 31 can assume a position relative to the plate stack 27 as in FIG. 10 during the measurement process.

The ratio X of the hole diameter D to the thickness of the plate stack 27 is, e.g., in the range from approximately 1:10 to approximately 1:40, preferably in the range from approximately 1:20 to approximately 1:30. The specified ratio X must on the one hand be chosen as large as possible so that the ground-glass screen 34 has maximum brightness and the exposure time of the camera 31 can be kept small. On the other hand, the angle of view through the ray selection unit corresponding to this ratio X, arctan (X), should be significantly smaller than what is known as the lobe width of the most sharply focused light function to be measured, for example the rear fog light. The measurement result can then be attributed with high precision to the luminous intensity in the measured direction.

During the measurement, it is not necessary for the measurement head 1 to be arranged at an exact distance from the light unit 25 under test. The fact that the brightness of the light unit 25 decreases as the square of the distance, is compensated by the fact that the camera 31 sees and records through each opening 28 of the plate stack 27 an area of the lamp unit 25 that increases as the square of the distance. In this way, self-compensation is achieved, so there is no need for a precise spacing to be maintained between the measurement head 1 and the light unit 25.

During the measurement in the example embodiment illustrated and described, the luminous intensity in the HO-VO direction is preferably measured. If the light tester is to be adjusted in the horizontal direction relative to the vehicle, the tester is moved by means of rollers on tracks, for example, which run in front of or behind the vehicle and at right angles to its length. If the camera 31 is a black-and-white camera, color filters are used to reproduce the (standardized) spectral sensitivity curve of the human eye. However, it is also possible to use a color camera, for example an RGB CCD camera, if the locations of the colors are also to be determined. The spectral sensitivity curves of the three RGB channels of this camera are adjusted by color filters to the CIE-standardized curves, so the spectral sensitivity curves of the RGB channels of the camera 31 correspond to the spectral sensitivity curve of the three eye sensor types. It is then possible to enable color location measurement with such a color camera 31. In a CIE color triangle, the color is described with two numbers, the x and y coordinates of the so-called color location in the CIE triangle. Legislation specifies the color locations that correspond to a certain wavelength, for example the "yellow/orange" color for turn signals and, e.g., the "red" color for brake lights and taillights.

The directional effect of the plate stack 27 is a result of the ratio X of hole diameter D to thickness of the plate stack 27. At a ratio, for example, of 4 mm to 100 mm, i.e. 1:25, an aperture angle of +/− arctan (0.02)=+/−1.15° results. This aperture angle must always be chosen to be significantly smaller than the lobe width of the measured taillight function. This ensures that the measurement result can be attributed with high precision to the luminous intensity under test in the HO-HV direction.

As is shown by way of example using FIGS. 6 and 7, instead of having the plate stack 27 consisting of individual plates 32, the measurement head 1 can have tubes 37, which are attached to lie upon one another and can have a round (FIG. 6) or hexagonal (FIG. 7) cross-section. The ratio of inside diameter of the tubes 37 to their length again lies in the range between approximately 1:10 and 1:40, preferably between approximately 1:20 and 1:30. In this way, the ratio of inside diameter and length of the tubes 37 is set such that the rays emitted from the light unit 25 under test emerge aligned from the tubes 37 and fall on the ground-glass screen 34 of the measurement head 1.

Not only can the light tester be used to test taillights, it can also be used to test headlights of vehicles.

The measurement head 1 is provided on the light tester such that it can be adjusted to the light unit 25 under test, not only in height, but also to a precise horizontal position.

The description of the invention is merely exemplary in nature and, thus, variations that do not depart from the gist of the invention are intended to be within the scope of the invention. Such variations are not to be regarded as a departure from the spirit and scope of the invention.

What is claimed:

1. Light tester for vehicles, comprising at least one measurement head that detects the rays emitted by the light unit under test, said measurement head has a ray selection unit that has passages for the rays, behind which passages is located at least one ray detection unit, wherein the ray selection unit consists of perforated plates, which are arranged behind one another and spaced apart, wherein the passages are all equally sized and the perforated plates are all of identical design, wherein all the passages of each of the perforated plates have the same center-to-center distance from one another and wherein all the passages are either circular or hexagonal, wherein the spacing between the perforated plates are different and corresponds to the relationship $a(i+1)=a(i) \times R/D$, where $i=0, 1, 2 \ldots$, D is the diameter of the passages, R is the center-to-center distance of the passages from one another, and $a(0)$ is the thickness of the perforated plate.

2. Tester according to claim 1, wherein the ratio (X) of the diameter (D) of the passage to the thickness of the ray selection unit is selected such that the brightness of the rays at the end of the ray selection unit is maximized, and the angle of view (arctan (X)) through the ray selection unit corresponding to this ratio (X) is smaller than a lobe width of a most sharply focused light function to be measured.

3. Tester according to claim 2, wherein the ratio (X) of the diameter (D) of the passage to the thickness of the ray selection unit lies in the range between approximately 1:10 and approximately 1:40.

4. Tester according to claim 2, wherein the ratio (X) of the diameter (D) of the passage to the thickness of the ray selection unit lies in the range between approximately b 1:20 and approximately 1:30.

5. Tester according to claim 1, wherein the passages constitute a ray passage whose effective length is great enough that rays incident at an angle are absorbed to the greatest degree possible.

6. Tester according to claim 1, wherein the measurement head has a ground-glass screen at the exit end of the rays.

7. Tester according to claim 1, wherein the ray detection unit is a camera.

8. Tester according to claim 7, wherein the camera is CCD camera.

9. Tester according to claim 7, wherein the camera is an RGB camera.

10. Tester according to claim 1, wherein the measurement head is held on a frame.

11. Tester according to claim 10, wherein the measurement head is adjustably mounted on the frame.

12. Tester according to claim 1, wherein the ray detection unit is connected to a computer.

13. Tester according to claim 1, wherein the ratio (X) of the diameter (D) of the passage to the thickness of the ray selection unit lies in the range between approximately 1:10 and approximately 1:40 and is selected such that the brightness of the rays at the end of the ray selection unit is maximized, and the angle of view (arctan (X)) through the ray selection unit corresponding to this ratio (X) is smaller than a lobe width of a most sharply focused light function to be measured.

14. Tester according to claim 1, wherein the ratio (X) of the diameter (D) of the passage to the thickness of the ray selection unit lies in the range between approximately 1:20 and approximately 1:30 and is selected such that the brightness of the rays at the end of the ray selection unit is maximized, and the angle of view (arctan (X)) through the ray selection unit corresponding to this ratio (X) is smaller than a lobe width of a most sharply focused light function to be measured.

* * * * *